(12) United States Patent
Petty et al.

(10) Patent No.: US 9,032,248 B1
(45) Date of Patent: May 12, 2015

(54) MEMORY WRITE TRACKING FOR VIRTUAL MACHINES

(71) Applicant: Amazon Technologies, Inc., Reno, NV (US)

(72) Inventors: Heath David Petty, Maple Valley, WA (US); Daniel Christianto, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 254 days.

(21) Appl. No.: 13/645,130

(22) Filed: Oct. 4, 2012

(51) Int. Cl.
*G06F 11/00* (2006.01)
*G06F 11/14* (2006.01)
*G06F 11/07* (2006.01)
*G06F 11/20* (2006.01)

(52) U.S. Cl.
CPC ........ *G06F 11/1456* (2013.01); *G06F 11/0712* (2013.01); *G06F 11/2023* (2013.01)

(58) Field of Classification Search
CPC ... G06F 11/0712; G06F 11/073; G06F 11/10; G06F 11/14; G06F 11/1456; G06F 11/20; G06F 11/2007; G06F 11/2017; G06F 11/2023; G06F 11/203; G06F 11/2038; G06F 11/2046; G06F 11/3055
USPC .................. 714/6.1, 6.3, 10, 11, 12, 13, 47.1
See application file for complete search history.

(56) References Cited

U.S. PATENT DOCUMENTS

| | | | |
|---|---|---|---|
| 8,527,990 B1* | 9/2013 | Marathe et al. .................... 718/1 |
| 8,756,455 B2* | 6/2014 | Ma .................................. 714/15 |
| 2007/0174361 A1* | 7/2007 | Branda et al. ................. 707/204 |
| 2008/0209145 A1* | 8/2008 | Ranganathan et al. ........ 711/162 |
| 2010/0211829 A1* | 8/2010 | Ziskind et al. .................. 714/48 |
| 2010/0262797 A1* | 10/2010 | Rosikiewicz et al. ......... 711/162 |
| 2010/0325485 A1* | 12/2010 | Kamath et al. ................. 714/15 |
| 2011/0218966 A1* | 9/2011 | Barnes et al. ................. 707/645 |
| 2013/0024855 A1* | 1/2013 | North .............................. 718/1 |
| 2014/0165056 A1* | 6/2014 | Ghai et al. ....................... 718/1 |

* cited by examiner

*Primary Examiner* — Joseph D Manoskey
(74) *Attorney, Agent, or Firm* — Klarquist Sparkman, LLP

(57) ABSTRACT

The disclosed system and method can use memory change tracking to lessen an amount of data that is synchronized between a primary virtual machine and a failover virtual machine so that the failover virtual machine can take over operations should the primary virtual machine become unavailable. A hardware-based memory synchronization manager on a primary physical host can be used to track the changes in the memory and transmit the same to a failover physical host so that the changes can be available, if necessary, by the failover virtual machine. The change tracking can be synchronized in nearly real time between the two physical hosts and can be small enough data updates to allow minimal network bandwidth over the network.

26 Claims, 11 Drawing Sheets

INITIALIZATION

ON BACKUP PHYSICAL HOST

FAILOVER FOR PARTIAL PRIMARY HOST FAILURE

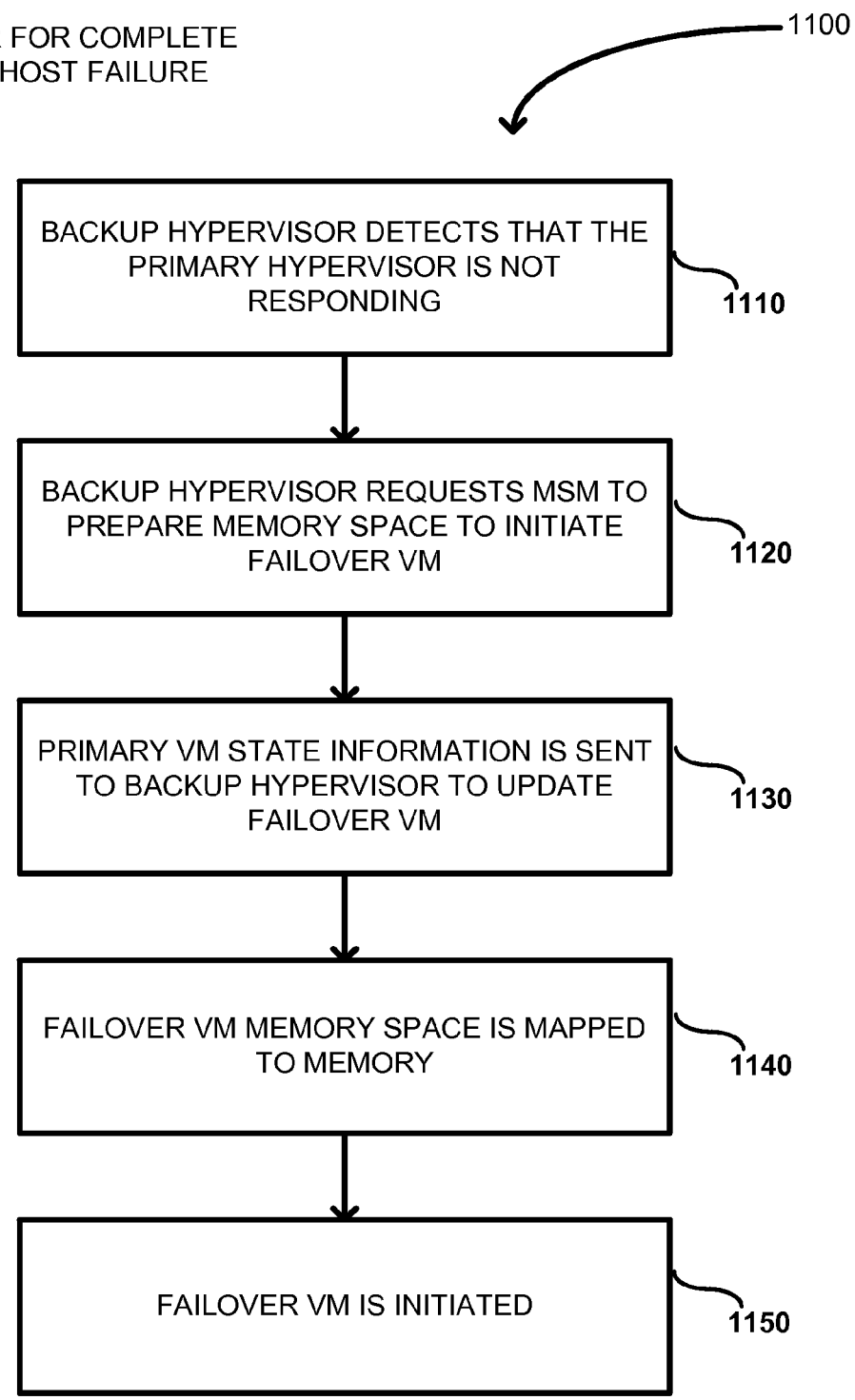

MEMORY WRITE TRACKING FOR VIRTUAL MACHINES

BACKGROUND

High availability is a system design approach and associated service implementation that ensures a prearranged level of operational performance will be met during a contractual measurement period. Users want software systems to be ready to serve them at all times. Availability refers to the ability of the user community to access the system, whether to submit new work, update or alter existing work, or collect the results of previous work. If a user cannot access the system, it is said to be unavailable. Generally, the term downtime is used to refer to periods when a system is unavailable.

Virtualization or cloud-computing environments has allowed IT infrastructure to reduce dependence on physical hardware. Yet, virtual machines still run in memory on a physical host. If the physical host reboots or fails, the memory also fails. In a high-availability configuration, this requires that another virtual machine take over providing services. However, any data in the memory of the failing virtual machine will be lost. There is also a time delay while the backup resources are brought on line and start providing service. In the past, work has been done to cut down this failover time for virtual machines by keeping two copies of memory so that a second virtual machine can be started and pickup exactly where the other virtual machine left off. With the growth in memory sizes, keeping two virtual machine's memory in sync across the network has become very difficult.

BRIEF DESCRIPTION OF THE DRAWINGS

FIG. 11 is a flowchart of a method for complete failure of the primary physical host.

DETAILED DESCRIPTION

Figure 1:
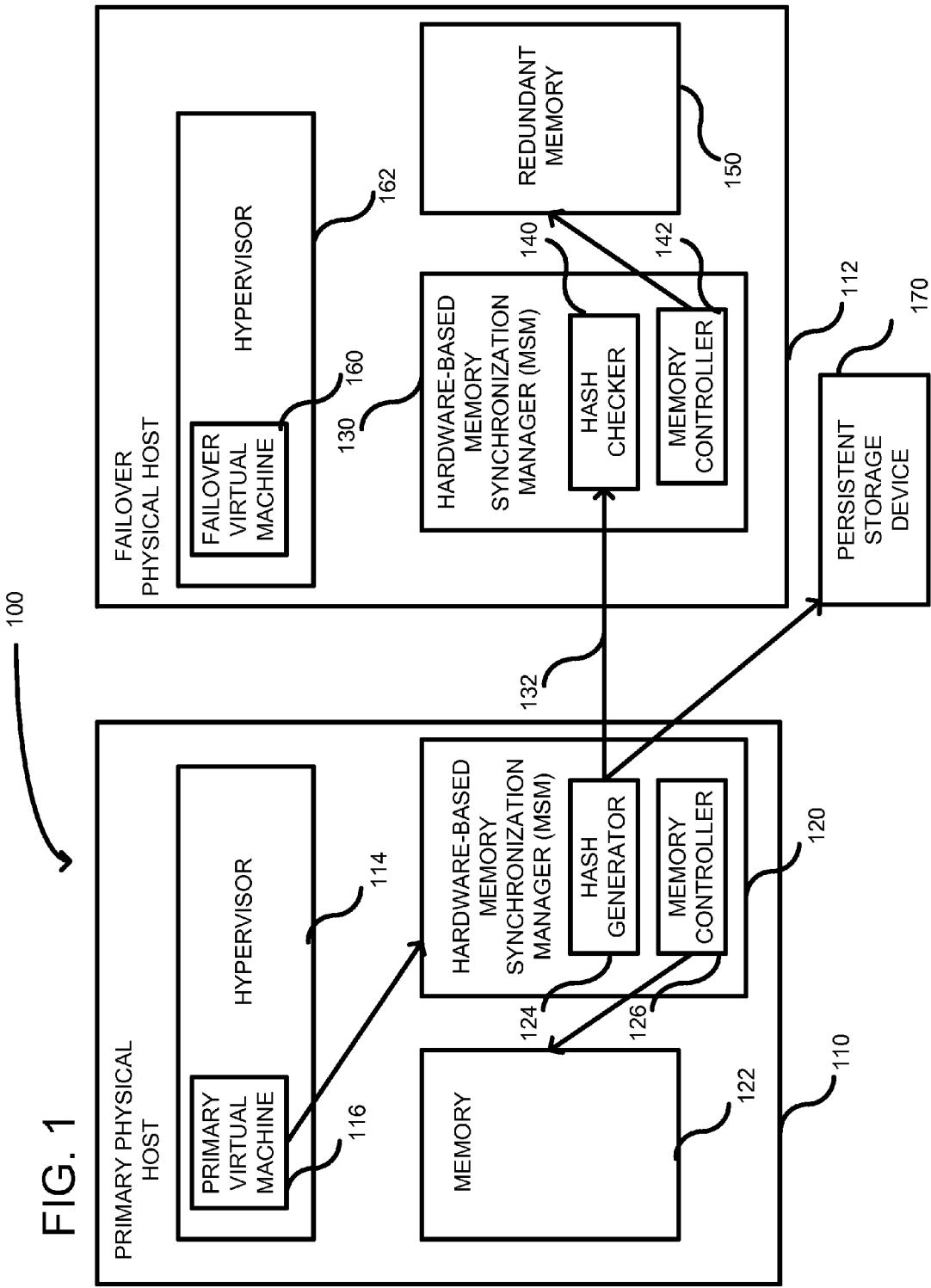
FIG. 1 is an example system diagram showing a primary physical host and a failover physical host.

FIG. 1 is an example system 100 showing a primary physical host 110 and a failover physical host 112. The primary physical host 110 includes a hypervisor 114. As is well understood in the art, the hypervisor presents a virtual operating platform and manages execution of potentially multiple operating systems that can share virtualized hardware resources on the primary physical host 110. An example primary virtual machine 116 is shown executing on the hypervisor 114. When the virtual machine 116 performs a memory write function, it can communicate through the hypervisor to a physical layer of the primary physical host 100 that includes a hardware-based memory synchronization manager (MSM) 120 and a memory 122. The MSM can include a hash generator 124 (or alternatively a checksum generator) and a memory controller 126. The memory controller 126 can be included within the MSM 120 or positioned separately therefrom. Generally, the memory controller 126 controls the timing needed to complete reads and writes to the physical memory 122. The MSM 120 can communicate with a MSM 130 located on the failover physical host 112 through a network 132. The MSM 130 can include a hash checker 140 (or alternatively a checksum checker) and a memory controller 142, which can be separated from the MSM 130. The memory controller 142 is for writing to a redundant memory 150, which stores a backup copy of memory 122 used by the primary virtual machine 116. The failover physical host 112 also includes a failover virtual machine 160 that can be used should the primary virtual machine 116 fail or otherwise terminates abnormally. As further described below, the failover virtual machine 160 can remain in a paused state until such time as a hypervisor 162 initiates the failover virtual machine 160. Once the failover virtual machine 160 starts, the redundant memory 150 can be synchronized to the memory 122 used by the primary virtual machine so as to make the transition seamless when switching between the virtual machines. In the case of disaster recovery, a persistent storage device 170, such as a solid-state drive (SSD), can be used.

The system 100 of FIG. 1 can use memory change tracking to lessen an amount of data that is synchronized between the primary virtual machine and the failover virtual machine so that the failover virtual machine can immediately take over operations should the primary virtual machine become unavailable. The MSMs 120, 130 can be used to track the changes in the memory 122 and transmit the same to the failover physical host 112 so that the changes can be available, if necessary, by the failover virtual machine 160. The change tracking can be synchronized in nearly real time between the two physical hosts 110, 112, and can be small enough data updates to allow minimal network bandwidth over the network 132. In some embodiments, a change log can be maintained and used to bring the redundant memory 150 up to a synchronized state. In the case of wide-spread failure, memory changes and the base memory footprint can be stored on the persistent storage device 170 to speed off-site recovery.

In some embodiments, the virtual machine's memory can be segmented so that only a critical section of memory is synchronized to further reduce synchronization overhead. The hash checker 140 can be used to rebuild any missing bits on the failover physical host. Additionally, the failover virtual machine 160 can be maintained in a pause state in order to reduce power consumption.

Figure 2:
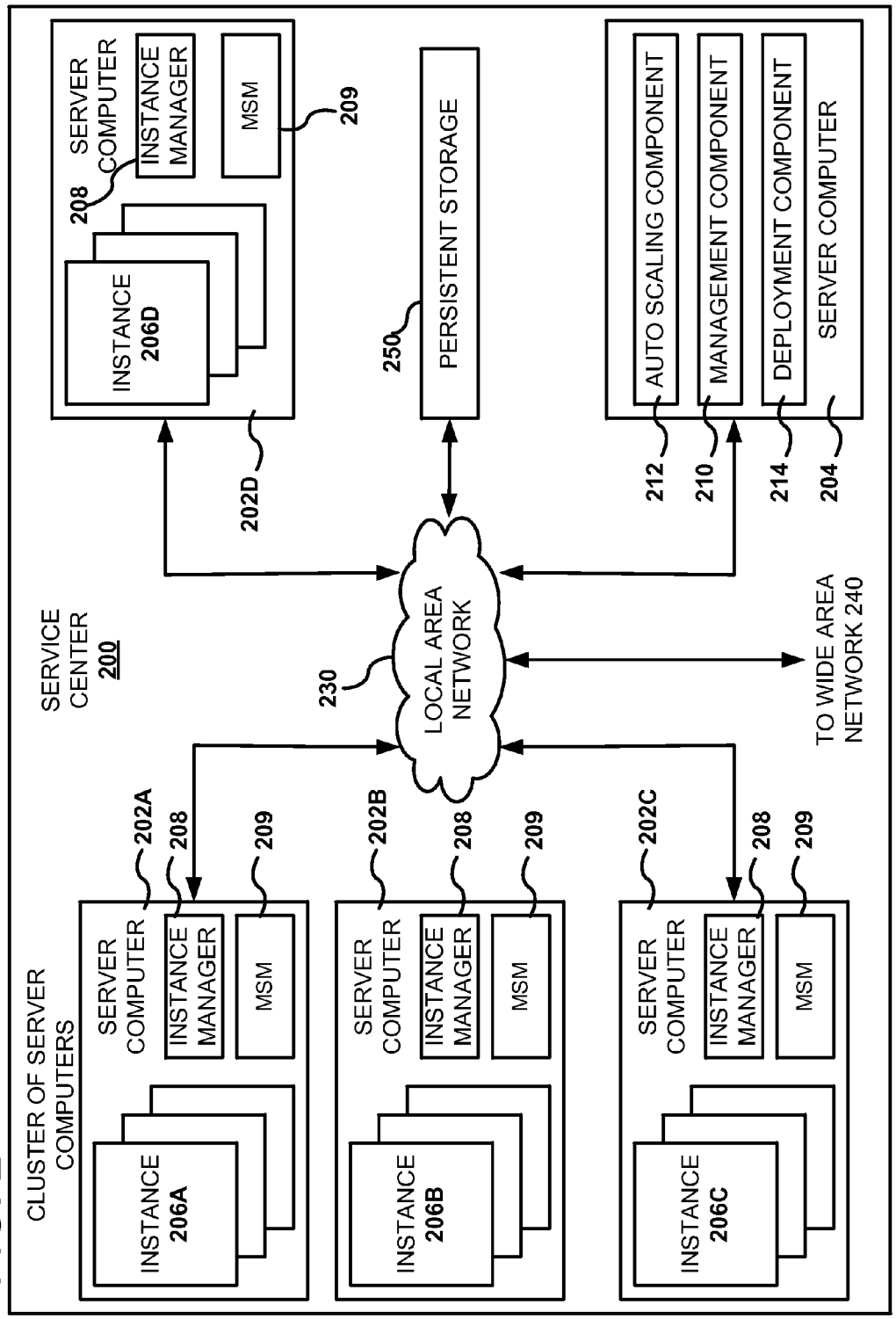
FIG. 2 is an example system diagram showing a plurality of virtual machine instances that can be used.

FIG. 2 is a computing system diagram of a network-based service center 200 that illustrates one environment in which a website analyzer can be used. By way of background, the service center 200 is capable of delivery of computing and storage capacity as a service to a community of end recipients. Generally speaking, the service center 200 can provide the following models: infrastructure as a service, platform as a service, and/or software as a service. Other models can be provided. For the infrastructure as a service model, the service center 200 can offer computers as physical or virtual machines and other resources. The virtual machines can be run as guests by a hypervisor, as described further below. The platform as a service model delivers a computing platform that can include an operating system, programming language execution environment, database, and web server. Application developers can develop and run their software solutions on the service center platform without the cost of buying and managing the underlying hardware and software. The software as a service model allows installation and operation of application software in the service center. In some embodiments, end users access the service center 200 using networked client devices, such as desktop computers, laptops, tablets, smartphones, etc. running web browsers or other lightweight client applications. Those skilled in the art will recognize that the service center 200 can be described as a "cloud" environment.

The particular illustrated service center 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machine instances. As known in the art, a virtual machine instance is an instance of a software implementation of a machine (i.e. a computer) that executes applications like a physical machine. In the example of virtual machine instances, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications. Each of the server computers 202A-202D can be further configured to include a memory synchronization manager 209, which can be similar to the MSMs 120, 130 disclosed in FIG. 1. Using the MSMs 209, any of the server computers 202A-202D can function as primary or failover virtual machines.

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 204 can be reserved for executing software components for managing the operation of the server computers 202 and the instances 206. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component can have access to account information associated with the instances, such as who is the owner of the account, credit card information, country of the owner, etc. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214. Other mechanisms might also be utilized to configure the operation of the deployment component 210.

A network 230 can be utilized to interconnect the server computers 202A-202D and the server computer 204, 252. The network 230 can be a local area network (LAN) and can be connected to a Wide Area Network (WAN) 240 so that end users can access the service center 200. It should be appreciated that the network topology illustrated in FIG. 2 has been simplified and that many more networks and networking devices can be utilized to interconnect the various computing systems disclosed herein.

As shown at 250, persistent storage 250 (such as an SSD) can be coupled to the local area network 230 to allow the MSMs 209 to further store memory pages in case disaster recovery is needed.

Figure 3:
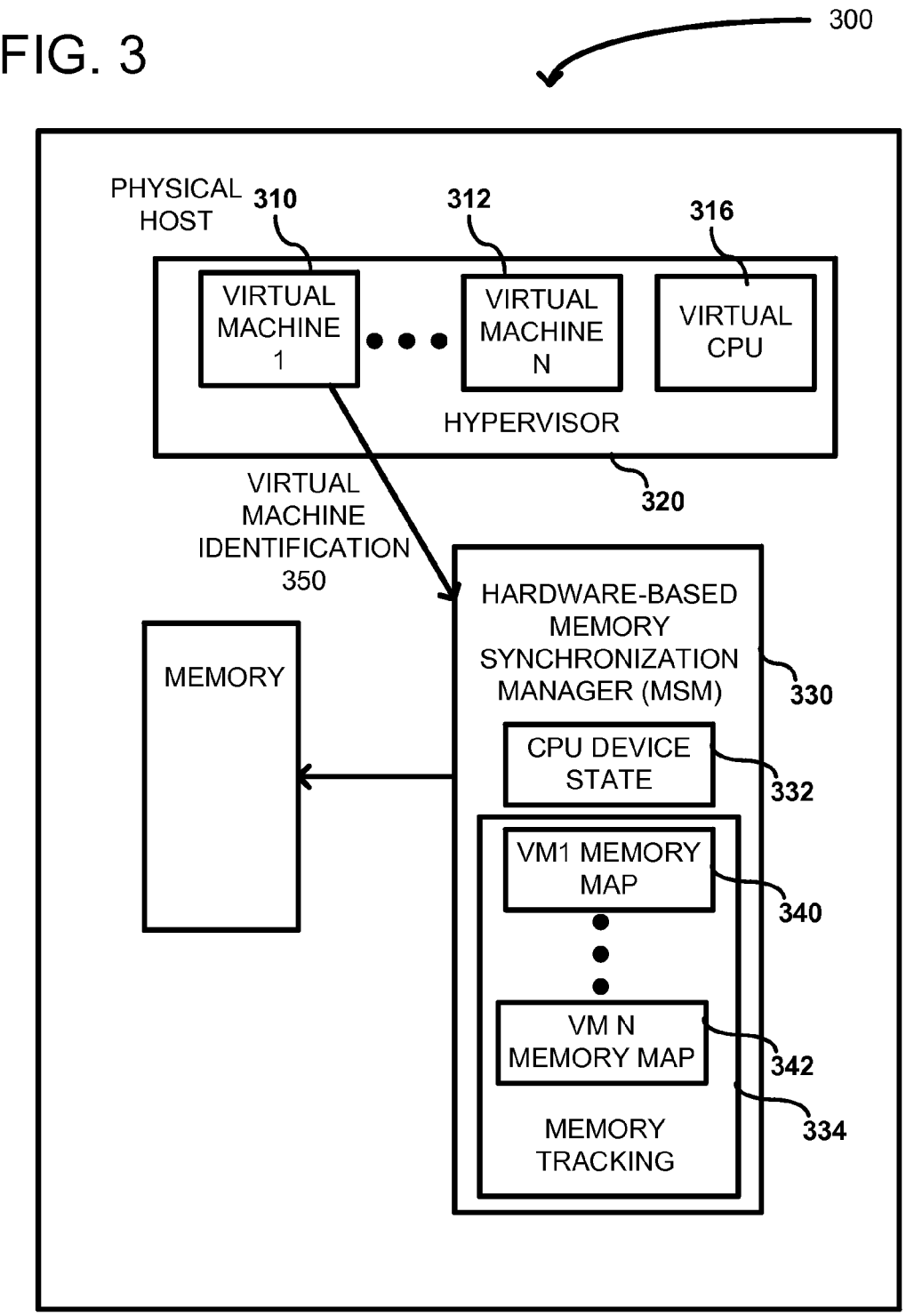
FIG. 3 is an example memory synchronization manager having multiple virtual machine memory maps.

FIG. 3 is an example embodiment of a physical host 300 running multiple virtual machines, such as virtual machines 310, 312. A virtual CPU 316 can also be running on a hypervisor 320. A hardware-based memory synchronization manager 330 can include storage for storing a CPU device state 332. Additionally, a memory tracking component 334 can store multiple memory maps 340, 342 corresponding to the virtual machines 310, 312. As indicated, the number of virtual machines and corresponding memory maps can be any number N. When a virtual machine, such as virtual machine 310, performs a write operation, the write instruction (including virtual address and data) is transmitted together with a virtual machine identification 350 to the MSM 330. Each virtual machine can have its own unique identification and the identification 350 allows the memory tracking component 334 to keep track of the memory and states for the different virtual machines 310, 312. The virtual machine identification 350 can be passed to the backup physical host so that the memory maps can be similarly maintained.

Figure 4:
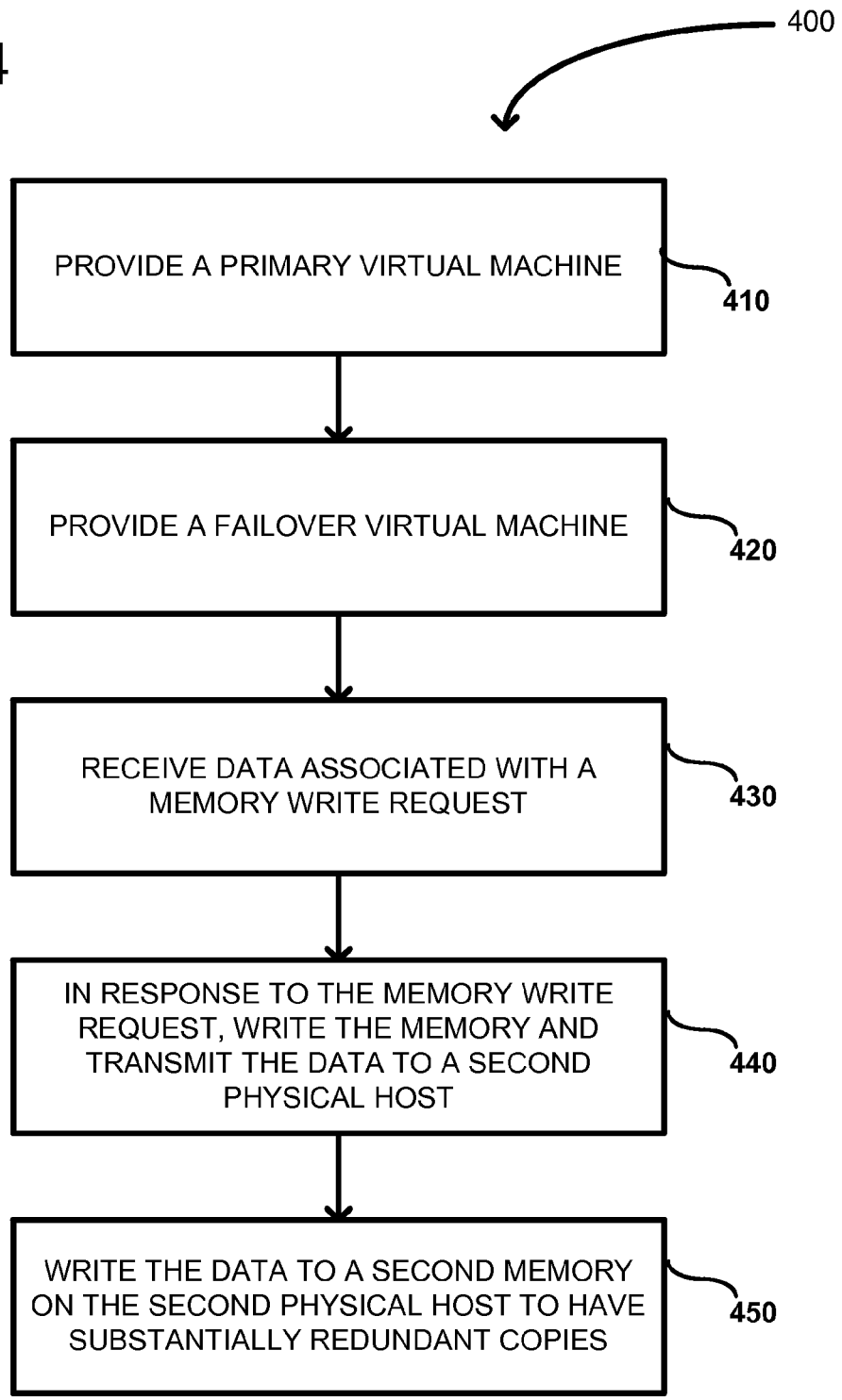
FIG. 4 is a flowchart of a method for synchronizing memory between a primary virtual machine and a failover virtual machine.

FIG. 4 is a flowchart 400 of a method for tracking memory changes for high availability virtual machines. In process block 410, a primary virtual machine can be provided on a first physical host. The primary virtual machine can be the machine that has already been instantiated and started. In process block 420, a failover virtual machine can be instantiated. In one embodiment, the failover virtual machine can be instantiated on a second physical host in response to instantiation of the primary virtual machine. In process block 430, data can be received in a MSM associated with a memory write request, which typically includes an address, the data, and possibly the virtual machine identification. In process block 440, in response to the memory write request, data can be written to the memory at a virtual address associated with the request. At nearly the same time, in process block 450, the data can be passed over a network to a MSM located on a backup physical host. The data can be buffered and transmitted as network bandwidth becomes available. In this sense, the transmitting to the second physical host can be asynchronous. In any event, ultimately, the data can then be written to memory on the second physical host or otherwise stored for later use should the memory need to be constructed. As such, the data on the second physical host can be a substantially redundant copy of the data on the first physical host. By substantially it is meant that the redundant copy can be identical, or there can be small differences, such as due to errors or implementation details.

Figure 5:
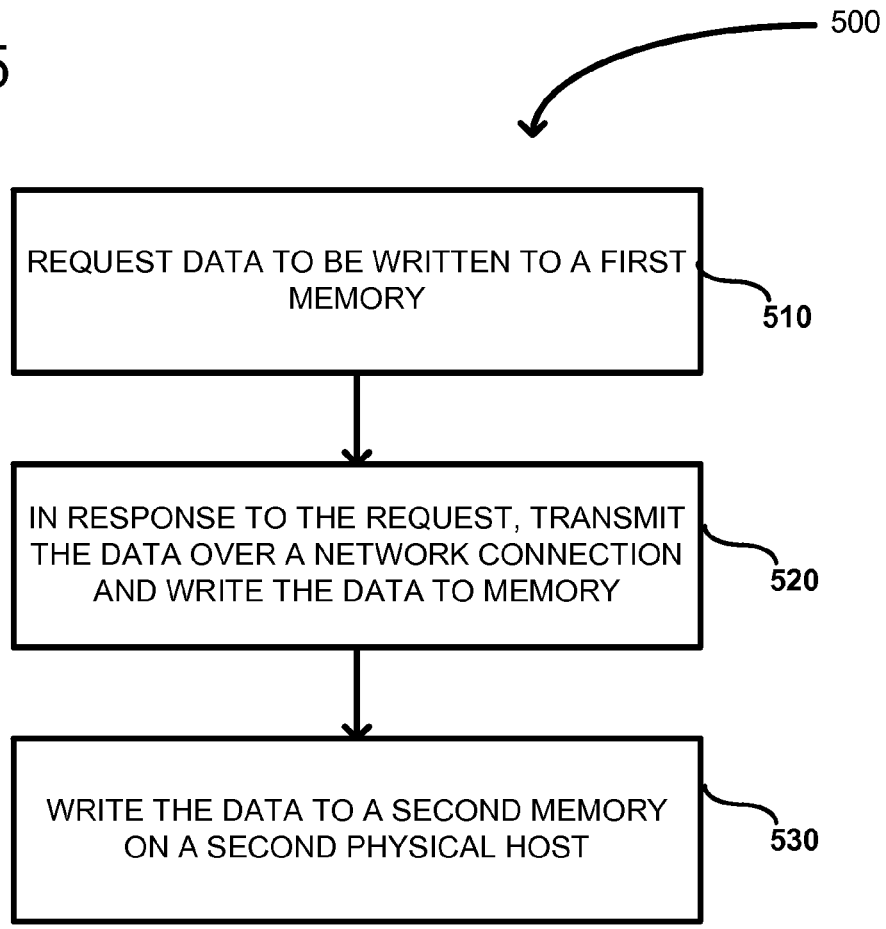
FIG. 5 is a flowchart of an alternative embodiment for synchronizing memory.

FIG. 5 is a flowchart 500 of another embodiment for tracking memory in virtual machines. In process block 510, a request can be made for data to be written to a first memory on a first physical host. The request can be made by a virtual machine and passed through a hypervisor to an MSM on the first physical host. In process block 520, in response to the request, the data can be transmitted over a network connection before or after the data is written to memory on the first physical host. For example, a primary virtual machine 116 can send the data to the MSM 120, which can then submit the data and address in a queue in the memory controller 126 for automatic writing to memory. Then, the MSM can transmit the data over the network 132 with or without the hash data. The transmission can be asynchronous with the writing to memory on the first physical host. In process block 530, the data can be written to memory on the second physical host so as to synchronize memory between the hosts.

Figure 6:
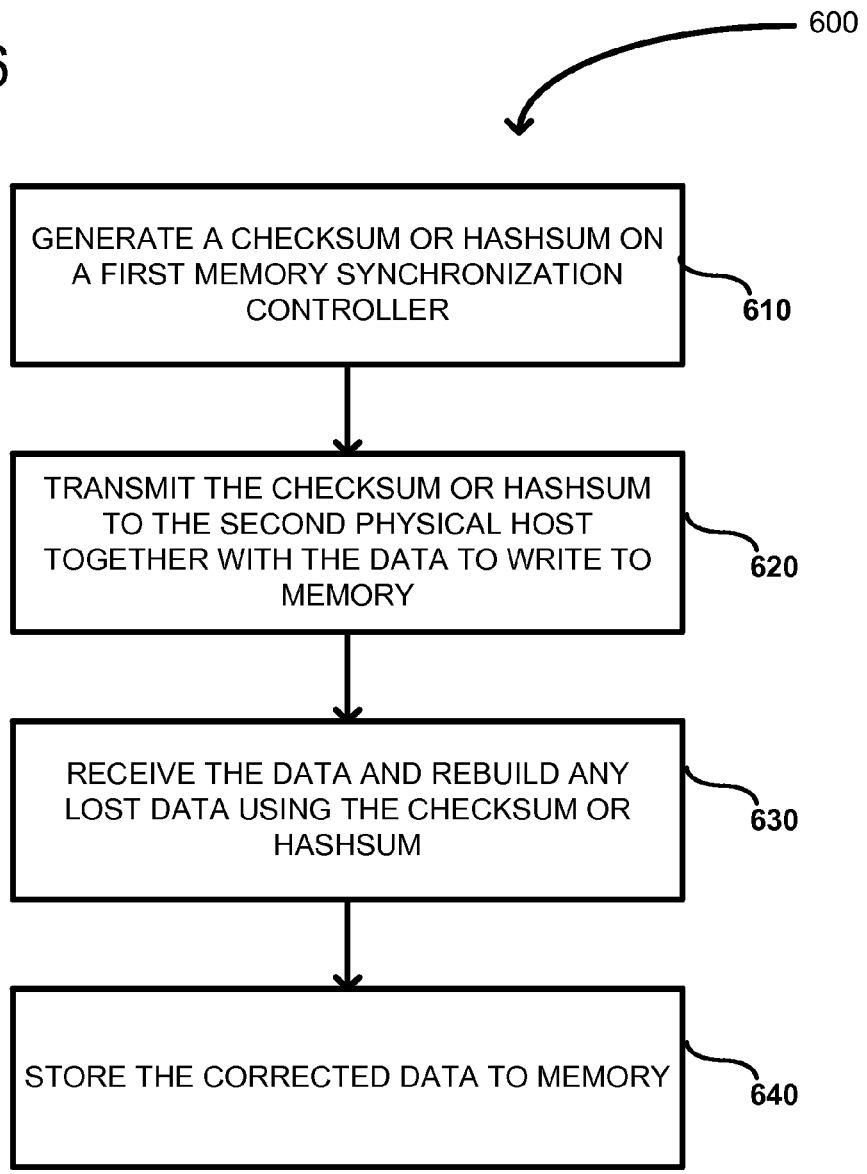
FIG. 6 shows further details of a method that can be performed when synchronizing memory.

FIG. 6 shows a flowchart 600 showing additional process blocks that can be implemented. In process block 610, a checksum or hashsum can be generated on a first MSM. For example, a hash generator 124 (FIG. 1) can be used to create a hash value. In process block 620, a checksum or hashsum can be transmitted to the second physical host. For example, the data to be written can be sent over the network 132 to the MSM 130 on the failover physical host 112. In process block 630, the data can be received on the second physical host. To the extent that any data is lost, such lost data can be rebuilt using the checksum or hashsum. In process block 640, the corrected data can be stored to memory on the second physical host.

Figure 7:
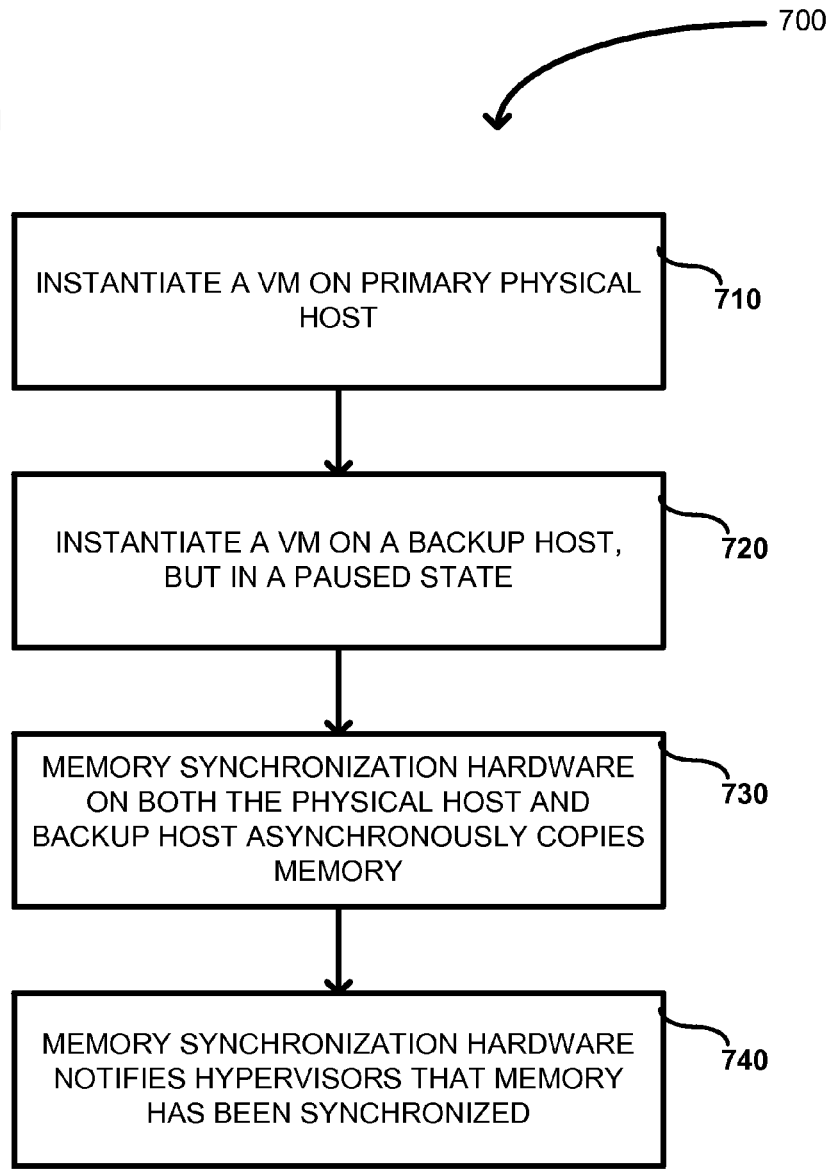
FIG. 7 is a flowchart showing a synchronization initialization phase.

FIG. 7 is a flowchart 700 showing an initialization phase for synchronizing memory in a high availability virtual machine. In process block 710, a virtual machine is instantiated on a primary physical host. The instantiation can be initiated by hypervisor, which can start the virtual machine to make it active. In process block 720, in response to instantiation or starting the virtual machine, a message can be sent through the network to the backup host to instantiate a virtual machine for purposes of synchronization. The virtual machine can then be instantiated on the backup host, but in a paused state, so as to save power. In process block 730, the MSM hardware on the primary host copies any page data associated with a memory write to the MSM on the backup host. Such a copying can be asynchronous with respect to the memory write on the primary host. One advantage of being asynchronous is that the MSM on the primary host can send the memory page data when network availability is sufficient. In process block 740, further communication between the MSMs can allow each MSM to communicate with its respective hypervisor to inform the hypervisor that memory has been synchronized.

Figure 8:
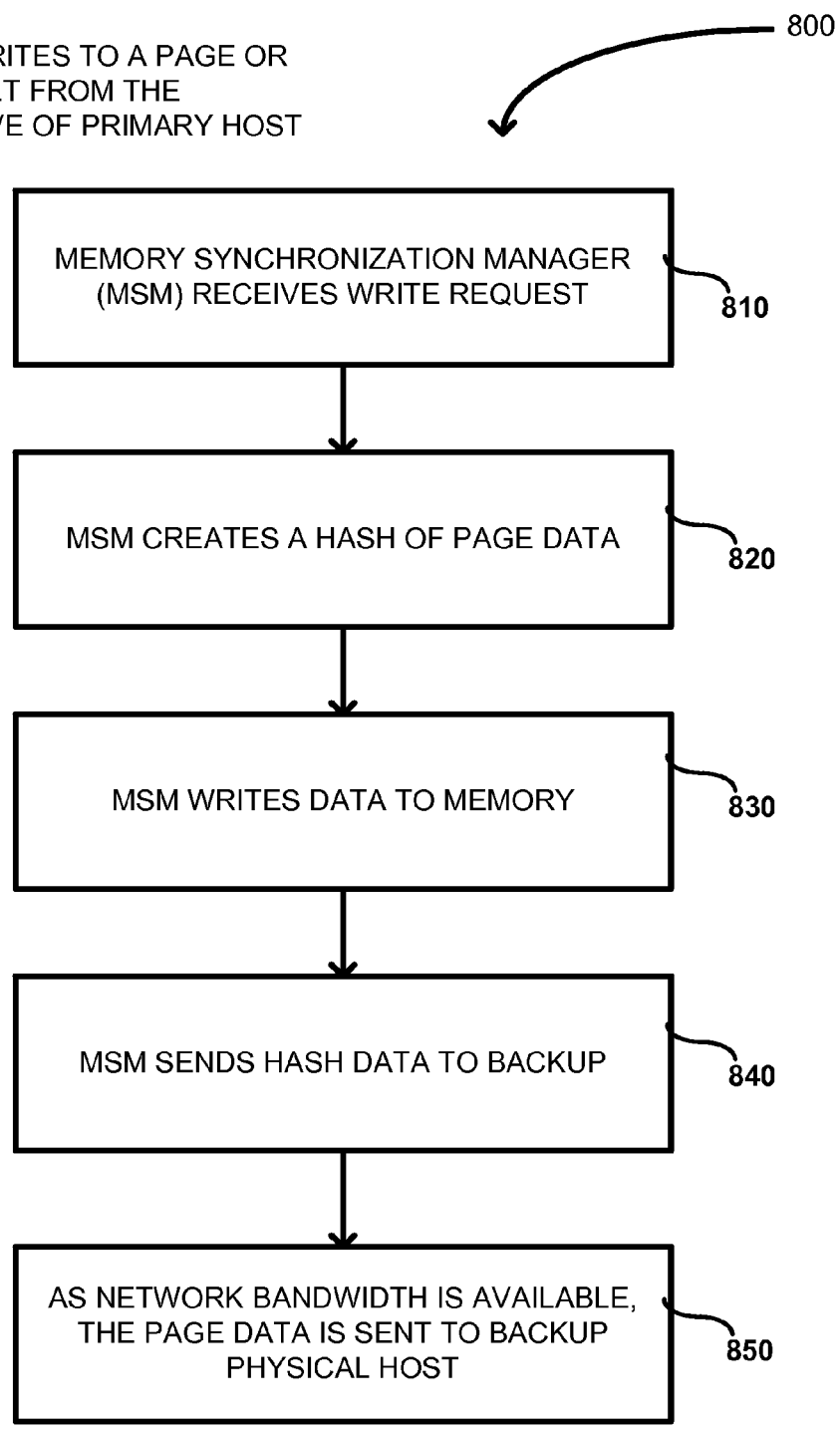
FIG. 8 is a flowchart of a method for synchronizing from the perspective of the primary physical host.

FIG. 8 is a flowchart 800 for writes from the perspective of the primary host. In process block 810, the MSM receives a write request from the hypervisor on the primary host. In process block 820, the MSM can generate a hash of the page data. For example, the hash generator 124 (FIG. 1) can be used to generate a hash value. In process block 830, the MSM can write the data, such as by either physically writing the data to memory, or by passing the data to a memory controller to complete the write to memory. In process block 840, the MSM then transmits the hash data to the backup physical host. It should be recognized that many of the process blocks can be completed in a different order, such as, for example, by swapping process block 830 and 840. At process block 850, as network bandwidth becomes available, the page data is transmitted over the network to the backup physical host. As a result, the MSM on the backup physical host received the page data associated with the write and the hash data. Other information can also be transmitted, such as address information and an identification of the virtual machine. It should also be noted that the memory page can be tracked via its virtual address rather than its physical address. Additionally, each time a virtual machine is scheduled out, the VCPU registers and device states can be synched.

Figure 9:
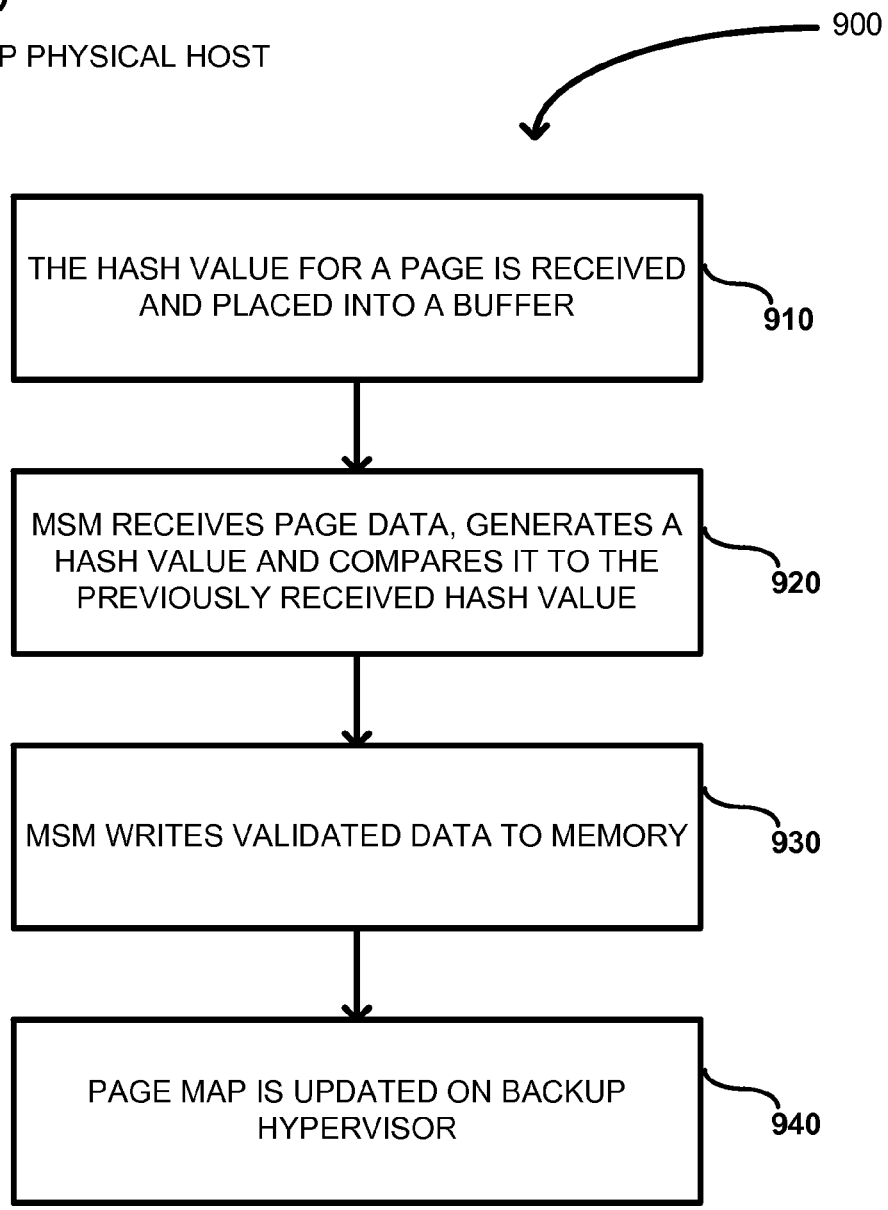
FIG. 9 is a flowchart of a method for synchronizing from the perspective of the backup physical host.

FIG. 9 is a flowchart 900 for writes from the perspective of the backup host. In process block 910, a hash value can be received from the primary host and placed in a buffer. In process block 920, the MSM can receive the page data, generate a hash value, and compare it to the previously received has value. If the hash is valid, then in process block 930, the MSM writes the validated data to memory on the backup server. In process block 940, the page map can be updated on the backup hypervisor. Additionally, hash data and page data can be flushed from the backup hypervisor MSM buffers.

Figure 10:
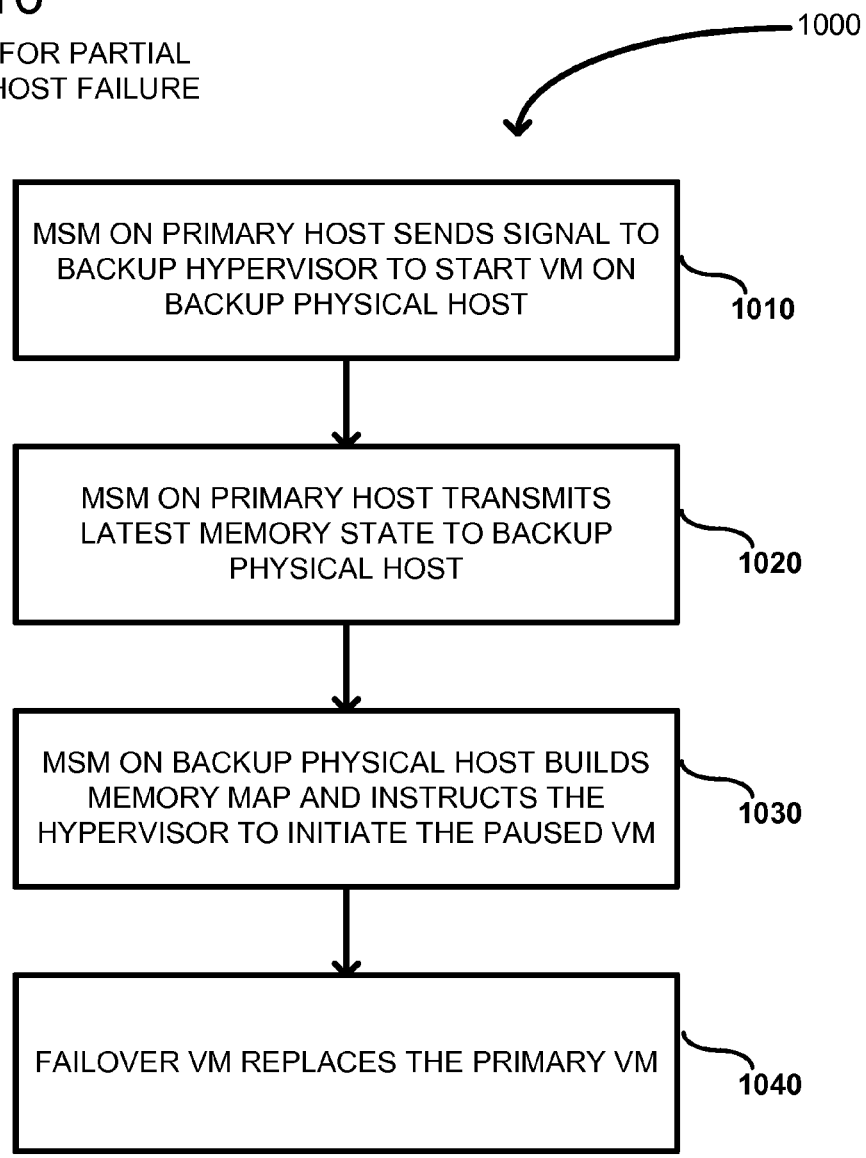
FIG. 10 is a flowchart of a method for partial failure of the primary physical host.

FIG. 10 is a flowchart 1000 illustrating failover for a partial primary host failure, such as a hardware failure (e.g., a hypervisor failure, single system power failure, or non-memory failure). In process block 1010, the MSM on the primary host can send a signal to the backup hypervisor to start the paused virtual machine on the backup physical host. In process block 1020, the MSM on the primary host transmits the latest memory state to the backup physical host. In process block 1030, the MSM on the backup physical host can build a memory map and instruct the hypervisor to initiate the paused virtual machine. In process block 1040, the failover virtual machine can take over or replace the primary virtual machine. All pending writes from the primary host hypervisor are desirably synchronized as soon as possible. In a case where a non-synchronized page is needed, a pagefault can be intercepted and that page can be synchronized from the hypervisor on the primary host.

FIG. 11 is a flowchart 1100 illustrating a failover for complete primary host failure. In process block 1110, the backup hypervisor detects that the primary hypervisor is not responding. Such is the case where a heartbeat signal is sent from the primary hypervisor to the backup hypervisor. The heartbeat signal can be coordinated through the respective MSMs. If a heartbeat signal is not detected, then in process block 1120, the backup hypervisor can request the MSM to prepare the memory space to initiate a failover virtual machine. In process block 1130, the primary virtual machine state information can be sent to the backup hypervisor to update the failover virtual machine. In process block 1140, the failover virtual machine memory space can be mapped to the memory on the physical backup host. Then in process block 1150, the failover virtual machine is removed from the pause state and initiated, so as to become active.

In cases where there is disaster recovery, if data was transmitted to persistent storage 170, a backup physical host can read all the data from the persistent storage and rebuild the memory space for the virtual machine.

One advantage of using a hardware MSM is that it can still run after a power outage. The MSM can also quickly obtain hash values and transmit the hash values increasing the likelihood a backup virtual machine can start successfully. Using hash values also reduces the possibility of data corruption. The MSM can also keep track of different virtual machines so that synchronizing can be done to different backup servers for load balancing. The backup memory can further allow data recovery or even forensic research.

In some embodiments, pages that are resident in memory are synchronized, while pages in the page cache or other caches are not synchronized. Additionally, memory mapped regions for hardware and files need not by synchronized.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of tracking memory changes for high availability virtual machines, comprising:
   providing a primary virtual machine instantiated on a first physical host;
   providing a failover virtual machine instantiated on a second physical host, the failover virtual machine for being switched to upon failure or abnormal termination of the primary virtual machine;
   receiving data associated with a memory write request from the primary virtual machine in a first hardware memory synchronization manager;
   in response to the memory write request, writing to a first memory associated with the primary virtual machine and transmitting, over a network, at least the data to a second hardware memory synchronization manager located on the second physical host, wherein the first hardware memory synchronization manager initiates both the writing to the first memory and the transmitting the data over the network; and
   writing the data to a second memory associated with the failover virtual machine so as to maintain substantially redundant copies between the first and second memories.

2. The method of claim 1, wherein the first and second hardware memory synchronization managers maintain a memory map for their respective primary and failover virtual machines.

3. The method of claim 1, wherein the primary virtual machine has an identification associated therewith that is maintained in the first hardware memory synchronization manager and that is included in the memory write request.

4. The method of claim 1, further including generating a hash value associated with the memory write request and transmitting the hash value to the second hardware memory synchronization manager together with the data.

5. The method of claim 1, further including, in response to the memory write request, writing the data to persistent storage separate from the first and second physical hosts.

6. A method of tracking memory in virtual machines, comprising:
   requesting data to be written to a first memory in a first virtual machine running on a first physical host;
   in response to the request, using a hardware memory synchronization manager, writing the data to the first memory on the first physical host and automatically transmitting the data, over a network connection, to a second physical host; and writing the data to a second memory on the second physical host so that the first and second memories contain the same data.

7. The method of claim 6, further including using a first hardware memory synchronization controller located on the first physical host to write the data to the first memory and to transmit the data over the network connection and a second hardware memory synchronization controller located on the second physical host to receive the data and to write the data to the second memory.

8. The method of claim 7, further including:
receiving, in the first hardware memory synchronization controller and from a first hypervisor on the first physical host, an identification associated with the first virtual machine; and
wherein the transmitting the data over the network connection to the second physical host includes transmitting the identification.

9. The method of claim 8, further including using the identification to determine a memory location of the second memory.

10. The method of claim 6, further including generating a checksum or hashsum on the data prior to transmitting the data over the network connection and using the checksum or hashsum to ensure that the data received on the second physical host is correct.

11. The method of claim 6, wherein the second physical host periodically checks availability of the first physical host, detects if the first physical host is not operational and automatically initiates a second virtual machine to take over operation from the first virtual machine.

12. The method of claim 6, wherein writing the data to the second memory on the second physical host is asynchronous with writing data to the first memory on the first physical host.

13. The method of claim 6, further including:
in response to launching an instance of the first virtual machine, automatically launching an instance of a second virtual machine, wherein the second virtual machine is maintained in a paused state.

14. The method of claim 13, further including automatically synchronizing all memory associated with the first virtual machine with memory for the second virtual machine, during an initialization phase, by communicating between hardware-based memory synchronization managers on the first and second physical hosts.

15. The method of claim 6, further including, in response to the request, transmitting the data, over the network connection, to persistent storage separate from the first and second physical hosts.

16. The method of claim 6, further including:
providing a first hardware memory synchronization controller located on the first physical host;
generating a hashsum or checksum on the first hardware memory synchronization controller associated with the data;
receiving a hashsum or checksum on the second physical host; and
rebuilding lost data on the second physical host using the hashsum or checksum.

17. One or more computer-readable media storing instructions thereon for executing a method, the method comprising:
providing first and second virtual machines running on different physical servers;
incrementally backing up memory of the first virtual machine by transmitting, to the second virtual machine, changes made to memory by the first virtual machine; and
wherein the changes to memory are automatically and asynchronously transmitted to the physical server associated with the second virtual machine by a hardware memory synchronization manager in response to writes to memory by the first virtual machine, the hardware memory synchronization manager being responsible for both writing to the memory associated with the first virtual machine and for transmitting the changes to the physical server associated with the second virtual machine.

18. The one or more computer-readable media of claim 17, further including receiving a heartbeat signal in the physical server associated with the second virtual machine indicating that the first virtual machine is operational.

19. The one or more computer-readable media of claim 17, further including asynchronously transmitting the changes to memory to persistent storage.

20. The one or more computer-readable media of claim 17, further including generating a checksum or hashsum prior to transmitting the changes and using the checksum or hashsum to ensure that the transmission is without error.

21. The one or more computer-readable media of claim 17, further including periodically checking availability of the physical server associated with the first virtual machine and, if the physical server associated with the first virtual machine is not operational, automatically initiating the second virtual machine to take over operation from the first virtual machine.

22. The one or more computer-readable media of claim 17, further including:
in response to launching an instance of the first virtual machine, automatically launching the second virtual machine, wherein the second virtual machine is maintained in a paused state.

23. A system for tracking memory in virtual machines, comprising:
a first physical server for executing a first virtual machine, the first physical server including a first memory synchronization manager and a first memory;
a second physical server for executing a second virtual machine, the second physical server including a second memory synchronization manager and a second memory; and
the first memory synchronization manager coupled to the second memory synchronization manager via a network connection, the first memory synchronization manager for receiving data associated with a memory write request and, in response to the memory write request, for writing the data to the first memory and for transmitting the data over the network connection to the second memory synchronization manager for storage in the second memory.

24. The system of claim 23, wherein the first memory synchronization manager includes a hash generator for generating a hash value associated with the data.

25. The system of claim 24, wherein the second memory synchronization manager includes a hash checker for checking the hash value to determine errors in the data.

26. The system of claim 24, wherein the first memory synchronization manager is configured to generate a heartbeat signal for transmission to the second memory synchronization manager.

* * * * *